United States Patent [19]

Siegfried et al.

[11] Patent Number: 5,615,944
[45] Date of Patent: Apr. 1, 1997

[54] AUTOMOTIVE DOME LIGHT ARRANGEMENT

[75] Inventors: David G. Siegfried, Vienna, Ohio; Robert W. Rimko, Transfer, Pa.; Anthony J. Corso, Struthers, Ohio

[73] Assignee: General Motors Corporation, Detroit, Mich.

[21] Appl. No.: 527,293

[22] Filed: Sep. 12, 1995

[51] Int. Cl.$^6$ ................................................. H01R 33/06
[52] U.S. Cl. .................... 362/226; 362/221; 313/318.02; 439/56
[58] Field of Search .................... 439/56, 67, 77, 439/242, 698; 313/318.01, 318.02, 318.09, 318.1; 362/80, 217, 221, 225, 226, 396

[56] References Cited

U.S. PATENT DOCUMENTS

| 3,156,841 | 11/1964 | Ayres | 313/318.1 |
| 3,915,544 | 10/1975 | Yurtin | 439/77 |
| 4,640,561 | 2/1987 | George | 439/77 |
| 4,928,210 | 5/1990 | Hayakawa et al. | 362/226 |
| 5,108,314 | 4/1992 | Takano et al. | 439/698 |

FOREIGN PATENT DOCUMENTS 2270804  3/1994  United Kingdom ............ 439/242

Primary Examiner—Alan Cariaso
Attorney, Agent, or Firm—Ernest E. Helms

[57] ABSTRACT

An automotive light arrangement is provided including a cartridge bulb which is generally cylindrical with a terminal cup at first and second ends; a terminal having two opposed arms, the arms having a first section of a bulb receiving end, the arms having a bulb clasping second section for compliantly holding a bulb terminal cap between the arms, the arms having a third section extending away from each other to a central plane section, the central plane section having first and second ends, the central plane section having at the first and second ends a pair of opposed ears extending in a direction toward the bulb cap generally perpendicular to the central plane section, each ear having an aperture, and the opposed ears at the first end being spaced from the opposed ears of the second end of the central section, and the terminal having a finger cut out from the plane section extending downwardly toward the cartridge bulb; a terminal housing mounting the terminal, the terminal housing having two apertures bifurcated by a bridge section, each aperture having an internal wall with a lock ramp for entry into the aperture of the ears to rigidly secure the terminal within the housing; and a flexible circuit having an exposed conductor leg positioned on the terminal housing bridge being biased in position and contacted by the terminal finger.

2 Claims, 1 Drawing Sheet

AUTOMOTIVE DOME LIGHT ARRANGEMENT

FIELD OF THE INVENTION

The field of the present invention is that of automotive lighting, particularly automotive lighting in and around the dome area in the interior of an automotive vehicle.

BACKGROUND OF THE INVENTION

Currently, many automotive vehicles have cartridge-type bulbs to provide the dome light within the vehicle. The wires which feed the cartridge-type bulb must be routed in the spacing in the vehicle between the headliner and the upper metal roof panel. The wires are then crimped to a pair of terminals, which then receive separate ends of the bulb. If assembly is improper, these wires are subject to rattling and other objectionable noise. To eliminate the rattling, it is desirable to use a flexible circuit which has a conductor encapsulated in two layers of nonconductive film. However, there must be a method provided for electrically connecting the flexible circuit with the cartridge bulb. The above-mentioned method should allow for rapid and reliable installation.

SUMMARY OF THE INVENTION

The present invention provides an automotive light arrangement which utilizes a flexible circuit conductor wherein assembly is achieved with minimal efforts, providing good reliability while at the same time not requiring the use of any crimping of terminal elements.

DESCRIPTION OF THE PREFERRED EMBODIMENT

Figure 1:
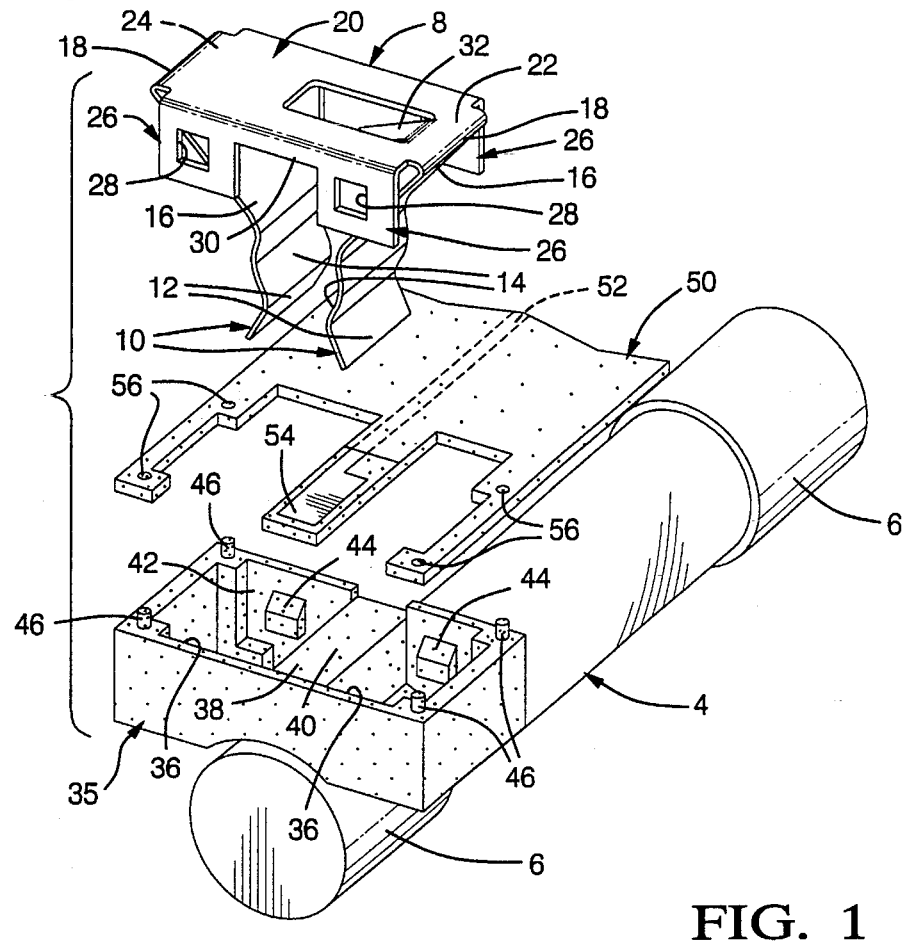
FIG. 1 is an exploded perspective view of a preferred embodiment of the present invention.
Figure 2:
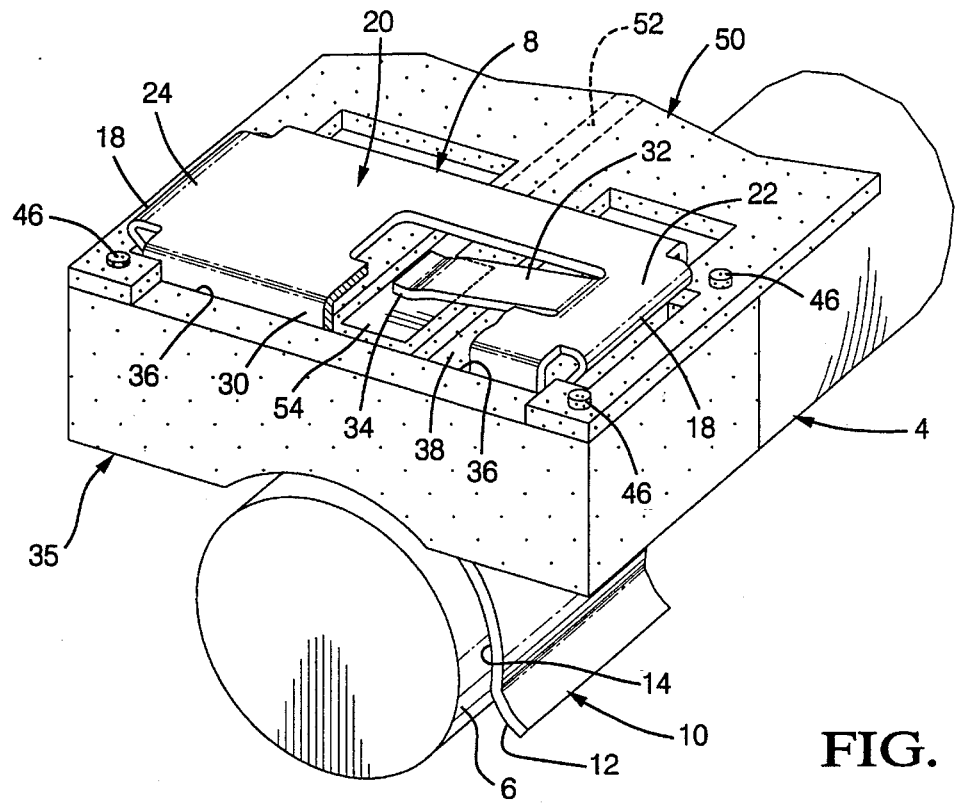
FIG. 2 is an enlarged perspective assembly view with portions cut out of the automotive light arrangement shown in FIG. 1.

Referring to FIGS. 1 and 2, the automotive dome light arrangement according to the present invention utilizes a cartridge bulb 4. The cartridge bulb is generally cylindrical in shape, having two conductive end caps 6. Typically, the bulb 4 will be rated for 10 watts and 0.75 amps and may be a bulb model 212-2 manufactured by General Electric.

Making contact with the end cap 6 will be a terminal 8. The terminal 8 is typically made from a conductive material such as steel and is stamped from a 0.35 mm thickness. The terminal has two arms 10. The arms 10 are opposed to one another, and each arm has an inclined bulb receiving end 12 for receipt of the end cap 6 of the bulb 4. Joined to the first section 12 is a second concave clasping section 14 for compliantly holding the bulb 4. The arms then have a third section 16 which extends away from the opposed arm and makes an intersection 18 with a central plane section 20. The central plane section has a first end 22 and a second end 24.

The central plane section 20 has at both ends a pair of opposed ears 26. Each opposed ear 26 has a rectangular aperture 28. The ears 26 are spaced from one another from the first and second ends of the terminal. The ears also descend from the central plane 20 in a direction toward the bulb 4 and are attached to the central plane 20 by a horizontal reinforcement section 30 which generally extends about the total length of the central plane 20.

Cut out from the terminal central plane is a contact finger 32 which is cantileveredly supported from the central plane in an area adjacent to the end 22 of plane 20 between one of the terminal arms 10 and the central plane 20. The contact arm 32 at its end has a bent section 34 in order to assure more secure contact.

The terminal is inserted within a housing 35. Housing 35 has two apertures 36 separated by a bridge section 38. The bridge 38 has along its length a slight recession 40.

The interior walls 42 of the housing apertures each have lock ramps 44 which project into apertures 28 of the ears upon insertion of the terminal 8. The housing is typically made from a polyester plastic material. The lock ramps 44 will typically have a 0.25 mm clearance with the apertures 28 of the terminal ears 26. The housing 35 also has locator pins 46 at its respective corners.

A flex circuit 50 provides the power to the light bulb 4 and has a foil conductor 52 encapsulated in upper and lower sheets of film and has along its top end a head 54 which is exposed by etching or other appropriate means. The flex circuit also optionally has four apertures 56 for location upon the pins 46. The conductor head 54 lays on the bridge 38, and the terminal 8 is inserted downwardly with a force of 35N. Upon being pushed downwardly, the ears 26 will become locked into position by the lock ramps 44. Lock ramps 44 also provide stiffening to the terminal. Insertion of the bulb cap 6 into the arms 10 will cause the arm to the right to move outwardly, pivoting the finger 32 downwardly to increase its biased force (from approximately 15N total to 18N total) upon the head 54. The spring finger 32 also holds the head 54 in position.

As will be known to those familiar with the art, another bulb and terminal combination will be placed on the other end cap 6 of the cartridge bulb 4 in a substantially identical fashion.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An automotive light arrangement comprising:

a cartridge bulb, the cartridge bulb being generally cylindrical with a terminal cup at first and second ends;

a terminal having two opposed arms, the arms having a first section of a bulb receiving end, the arms having a bulb clasping second section for compliantly holding a bulb terminal cap between the arms, the arms having a third section extending away from each other to a central plane section, the central plane section having first and second ends, the central plane section having at the first and second ends a pair of opposed ears extending in a direction toward the bulb cap generally perpendicular to the central plane section, each ear having an aperture, and the opposed ears at the first end being spaced from the opposed ears of the second end of the central section, and the terminal having at least one contact finger cut out from the plane section extending downwardly toward the cartridge bulb;

a nonconductive terminal housing mounting the terminal, the terminal housing having two apertures bifurcated by a bridge section, each aperture having an internal wall with a lock ramp for entry into the aperture of the terminal ears to rigidly secure the terminal within the terminal housing; and a flexible circuit having an exposed conductor leg positioned on the terminal housing bridge being biased in position and contacted by the terminal finger.

2. An automotive dome light arrangement as described in claim 1 wherein the finger is cantilevered and has a base joined to the central section of the terminal closely adjacent to an intersection of the third section of the arm with the central section and wherein placement of the bulb within the arms of the terminal causes the finger to press against the flexible circuit with greater force.

* * * * *